United States Patent
Van Raepenbusch et al.

(10) Patent No.: US 12,253,115 B2
(45) Date of Patent: Mar. 18, 2025

(54) MULTI-PACK CLUTCH ASSEMBLY WITH ACTUATOR

(71) Applicant: Dana Belgium N.V., Bruges (BE)

(72) Inventors: Filip Van Raepenbusch, Bruges (BE); Kurt Cattoor, Koolkerke (BE)

(73) Assignee: DANA BELGIUM N.V., Bruges (BE)

( * ) Notice: Subject to any disclaimer, the term of this patent is extended or adjusted under 35 U.S.C. 154(b) by 21 days.

(21) Appl. No.: 18/311,136

(22) Filed: May 2, 2023

(65) Prior Publication Data
US 2024/0369111 A1 Nov. 7, 2024

(51) Int. Cl.
F16D 25/0638 (2006.01)
F16D 21/08 (2006.01)

(52) U.S. Cl.
CPC ......... *F16D 25/0638* (2013.01); *F16D 21/08* (2013.01)

(58) Field of Classification Search
CPC .................................................. F16D 25/0638
See application file for complete search history.

(56) References Cited

U.S. PATENT DOCUMENTS

| | | | |
|---|---|---|---|
| 2,950,630 A | 8/1960 | Zeidler | |
| 3,253,688 A * | 5/1966 | Livezey | B62D 11/10 192/48.619 |
| 6,948,604 B2 * | 9/2005 | Puiu | B60K 17/344 192/93 A |
| 7,686,730 B2 | 3/2010 | Baldwin | |
| 8,245,826 B2 * | 8/2012 | Ohashi | F16D 25/10 192/3.3 |
| 8,689,958 B2 | 4/2014 | Noehl et al. | |
| 8,991,577 B2 | 3/2015 | Hauck | |
| 9,546,729 B2 | 1/2017 | Bird et al. | |
| 11,168,745 B2 * | 11/2021 | Sori | F16D 13/52 |
| 11,460,098 B2 * | 10/2022 | Bhurke | F16H 48/34 |
| 11,802,596 B2 * | 10/2023 | Cattoor | F16H 63/3026 |
| 2007/0272508 A1 | 11/2007 | Toya et al. | |
| 2008/0121447 A1 | 5/2008 | Lang et al. | |
| 2013/0126291 A1 | 5/2013 | Hauck | |

FOREIGN PATENT DOCUMENTS

| | | | | |
|---|---|---|---|---|
| CN | 110645285 A | * | 1/2020 | ............ A01D 69/06 |
| DE | 102012024699 A1 | | 7/2013 | |
| DE | 102019100970 A1 | | 7/2020 | |
| KR | 20200047092 A | | 5/2020 | |

* cited by examiner

*Primary Examiner* — James J Taylor, II
(74) *Attorney, Agent, or Firm* — McCoy Russell LLP

(57) ABSTRACT

Systems and methods for a clutch assembly. The clutch assembly includes a first clutch pack coupled to a component via a rotational connection component and a second clutch pack coupled to a drum via the rotational connection component. The clutch assembly further includes an actuation piston configured to actuate the first clutch pack and the second clutch pack.

4 Claims, 2 Drawing Sheets

MULTI-PACK CLUTCH ASSEMBLY WITH ACTUATOR

TECHNICAL FIELD

The present disclosure relates to a friction clutch with multiple clutch packs that are jointly engaged and disengaged using an actuator.

BACKGROUND AND SUMMARY

Previous powertrains and other systems have made use of friction clutches to allow for smoother clutch engagement and disengagement in comparison to other types of clutches such as dog clutches. In certain systems, the friction clutches, when disengaged, experience higher differential rotational speeds across the clutches. For instance, certain electrified powertrains using electric motors have higher rotational speeds than internal combustion engine powertrains. The high rotational speed differential across friction clutches decreases clutch lifespan and may cause inoperability, in certain scenarios. To elaborate, wet friction clutches experience friction between the plates during disengagement. Higher differential speeds across the clutch will therefore cause increased friction, in previous friction clutches.

Facing the abovementioned issues, the inventors developed a clutch assembly to overcome at least a portion of the issues. The clutch assembly, in one example, includes a first clutch pack coupled to a component (e.g., a gear) via a rotational connection component. In such an example, the clutch assembly further includes a second clutch pack coupled to a drum (e.g., hub) via the rotational connection component. The clutch assembly even further includes, an actuation piston configured to actuate the first clutch pack and the second clutch pack. Additionally, the first clutch pack is axially spaced away from the second clutch pack and the drum is coupled to a shaft. The use of the multiple clutch packs rotationally coupled using the rotational connection component (functioning as a mechanical linkage) allows the differential speed across the clutch assembly to be reduced. As a result, the clutch's longevity and reliability is increased.

Further, in one example, the first clutch pack is coupled to the component via a first set of separator plates and coupled to the rotational connection component via a first set of friction plates. Further, in such an example, the second clutch pack is coupled to the rotational connection component via a second set of friction plates and coupled to the drum via a second set of separator plates. In this way, the clutch packs are effectively rotationally coupled to the rotational connection component.

Still further, in one example, the clutch assembly may further include a bearing coupled to the shaft and the rotational connection component. The bearing is configured to accommodate for axial movement of the rotational connection component. The bearing may be a bushing or a roller type bearing. In this way, the rotational connection component and the shaft are able to independently rotate. Using the bearing in this manner allows the compactness of the clutch assembly to be increased, if so desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A clutch with multiple clutch packs that are coupled to one another using a mechanical rotational connection that attaches plates in the clutch packs for rotation with one another. In the clutch assembly, an actuation piston actuates both of the clutch packs, allowing the clutch assembly to function as a multi-pack clutch with a multi-pack actuator. The rotational component provides a rotational linkage between the clutch packs which allows the relative speed between the input and the output of each of the clutch packs to be reduced. As a result, clutch longevity is increased and the likelihood of clutch degradation is reduced. In this way, a clutch assembly that is more robust and less susceptible to wear than previous clutches is achieved.

Figure 1:
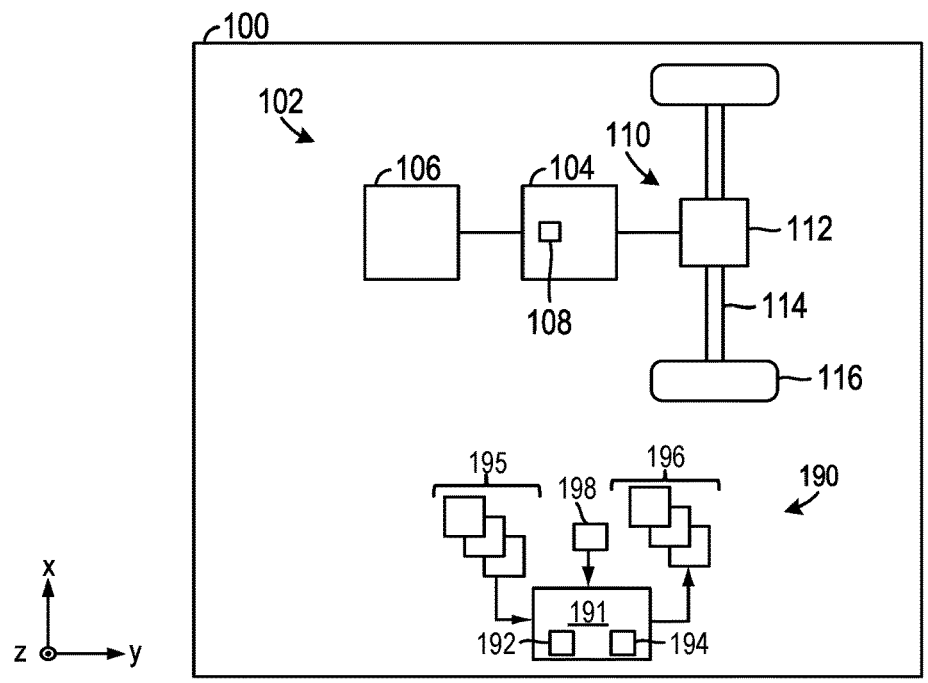
FIG. 1 shows a schematic depiction of a vehicle that includes a transmission with a clutch assembly.

FIG. 1 shows a schematic illustration of a vehicle 100. The vehicle may be a passenger vehicle, a commercial vehicle, an on-highway vehicle, or an off-highway vehicle, in different examples.

In the vehicle example, the vehicle 100 includes a powertrain 102 with a transmission 104 (e.g., gearbox) and a prime mover 106 (e.g., an internal combustion engine and/or an electric motor). When the prime mover is an electric motor, the motor may be included in an electric drive system. The prime mover 106 delivers mechanical power to the transmission during powertrain operation. In the case of electric drives, power may flow from the transmission to the electric motor while the motor is operated as a generator. Further, the transmission 104 is mechanically coupled to an axle assembly 110 to enable torque transfer therebetween. The axle assembly 110 may include a differential 112, axle shafts 114, and/or drive wheels 116.

The transmission 104 may include at least one clutch assembly 108 (e.g., a wet clutch assembly). The transmission 104 may further include gears, shafts, and the like which may function to alter the speed of the mechanical input from the prime mover enable for speed changes. The clutch assembly 108 may be designed to alter the operating gear ratio of the transmission or function to disconnect the transmission from upstream of downstream components, in one example. In another example, the clutch assembly may be used to selectively connect auxiliary equipment connected to power take-offs or inputs from auxiliary drives.

The clutch assembly 108 is schematically depicted in FIG. 1. However, it will be appreciated that the clutch assembly has greater structural and functional complexity that is expanded upon herein with regard to the exemplary clutch assembly depicted in FIGS. 2A and 2B.

As illustrated in FIG. 1, the prime mover 106, the transmission 104, and the axle assembly 110 are spaced away from one another. However, it will be appreciated that one or more of these components may be collocated with one another in an assembly. For instance, when the vehicle is an electric vehicle, the electric motor, the transmission, and the axle assembly may form an electric axle, in other examples.

The vehicle 100 may further include a control system 190 with a controller 191 (e.g., a transmission control unit (TCU)), as shown in FIG. 1. The controller 191 may include a microcomputer with components such as a processor 192 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions that are executable by the processor for performing the methods and control techniques described herein as well as other variants that are anticipated but not specifically listed. As such, the control techniques, methods, and the like expanded upon herein may be stored as instructions in non-transitory memory.

The controller 191 may receive various signals from sensors 195 coupled to various regions of the system 100. For example, the sensors 195 may include a pedal position sensor designed to detect a depression of an operator-actuated pedal such as an accelerator pedal and/or a brake pedal, speed sensor(s) at the transmission input and/or output shaft, gear selector sensor, clutch position sensors, and the like. An input device 198 (e.g., accelerator pedal, brake pedal, drive mode selector, gear selector, combinations thereof, and the like) may further provide input signals indicative of an operator's intent for system control.

Upon receiving the signals from the various sensors 195 of FIG. 1, the controller 191 processes the received signals, and employs various actuators 196 of system components to adjust the components based on the received signals and instructions stored on the memory of controller 191. For example, the controller 191 may be designed to engage and disengage the clutch assembly 108. For instance, the controller 191 may determine that transmission should be shifted to another gear or disconnected from the axle or the prime mover. In response to this determination, the controller 191 may command the actuation of the clutch assembly to disengage or engage the clutch. The other controllable components in the system may function in a similar manner with regard to sensor signals, control commands, and actuator adjustment, for example.

Figure 2A:
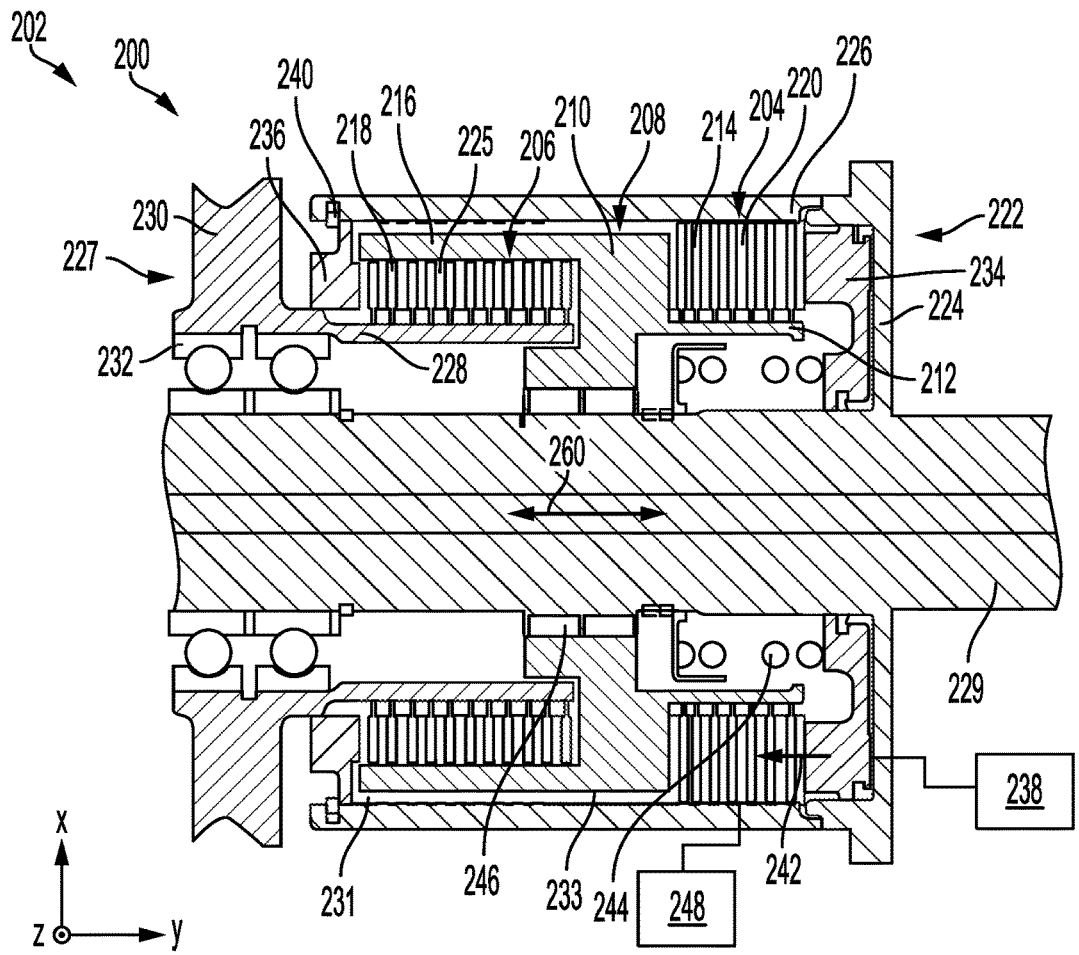
FIGS. 2A and 2B show an example of a clutch assembly in a disengaged configuration and an engaged configuration, respectively.
Figure 2B:
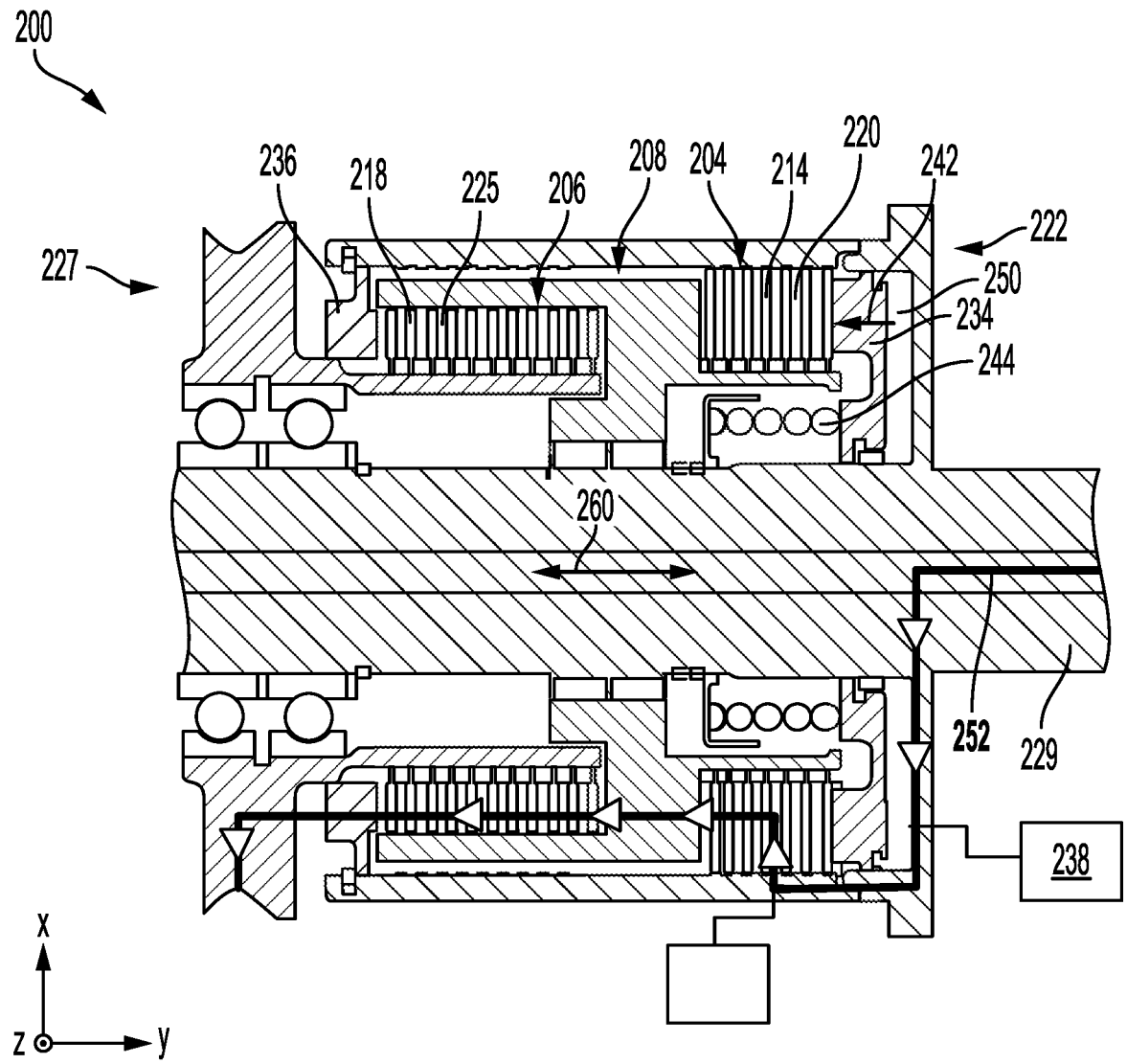

An axis system is provided in FIG. 1 as well as FIGS. 2A-2B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. A rotational axis 260 of a shaft 229, a component 227, and clutch packs 204, 206 is also provide for reference.

FIG. 2A shows an example of a clutch assembly 200 in a transmission 201 or other suitable system. The clutch assembly 200 is an example of the clutch assembly 108, depicted in FIG. 1. The clutch assembly 200 includes the clutch pack 204 and the clutch pack 206 which are coupled via a rotational connection component 208 (e.g., a mechanical linkage). It will be appreciated that the clutch pack 204 may be referred to a first clutch pack and the clutch pack 206 may be referred to a second clutch pack and vice versa. The number associated with each of the clutch packs and other components described herein does not denote any structural or function hierarchy but rather may solely indicate the order in which the clutch packs and components have been introduced. Further, in alternate examples, the clutch assembly 200 may include additional clutch packs which are again connected to one another using a rotational connection component. In such an example, the axial length of the clutch assembly may be increased and the clutch packs may be arranged in series. Using multiple clutch packs and the rotational connection component 208 in the clutch assembly allows the relative speed across the clutch assembly to be reduced. As a result, wear on plates in the clutch packs are reduced, thereby increasing clutch longevity and reliability (by decreasing the chance of clutch inoperability).

The rotational connection component 208 provides a rotatable mechanical link between the clutch packs. The rotational connection component 208 may include a body 210 with an extension 212 that is coupled to the clutch pack 204 via a set of friction plates 214. Likewise, the rotational connection component 208 includes an extension 216 that is coupled to the clutch pack 206 via a set of separator plates 225. To elaborate, the friction plates 214 and the separator plates 225 may be splined to the extension 212 and the extension 216, respectively. The clutch pack 204 further includes separator plates 220 that are coupled to (e.g., splined to) a drum 222 (e.g., a hub). The drum 222 includes a radial section 224 and an axial section 226 (e.g., annular section). The radial section 224 is fixedly coupled to the shaft 229 and rotates therewith. However, it will be understood that the drum 222 may be fixedly coupled to other suitable rotating components in the transmission 202, in alternate examples.

Friction plates 218 in the clutch pack 206 are coupled to (e.g., splined to) the component 227 (e.g., driven gear). To elaborate, the friction plates 218 are coupled to a radial extension 228 which is fixedly coupled to a gear body 230, in the illustrated example. However, the component may take another form, in alternate examples. For instance, the component 227 may be a shaft, in an alternate example. The friction and separator plates in each of the friction clutches may be conceptually grouped together as sets of plates. The friction plates and the separator plates in each of the clutch packs are interleaved. Further, the gear body 230 may include teeth that mesh with another gear in the transmission.

In the illustrated example, the axial section 226 of the drum 222 circumferentially encloses the clutch pack 204, the clutch pack 206, and the rotational connection component 208. In this way, the clutch assembly achieves a compact architecture. However, clutch configurations where the clutch packs are positioned radially outboard from the drum have been contemplated.

In the illustrated example, bearings 232 (e.g., ball bearings, roller bearings, and the like) may be coupled to the shaft 229 and the gear body 230. In this way, the gear may be idly mounted on the shaft 229 and the shaft is allowed to independently rotate in relation to the gear during clutch assembly disengagement.

The clutch packs 204 and 206 may be positioned axially between an actuation piston 234 (e.g., a hydraulically actuated piston) and an end plate 236. The piston 234 may be hydraulically or pneumatically actuated via an actuation system 238. The end plate 236 is fixedly coupled to the drum 222. A ring 240 may be coupled to the axial section 226 of the drum 222 to axially delimit movement of the end plate 236. The actuation system 238 is configured to urge the piston 234 in the direction 242 to induce engagement of the clutch packs 204 and 206. In the illustrated example, a spring 244 (e.g., a return spring) is coupled to the piston 234 and urges the piston back into a disengagement position when the pressure applied to the piston (via hydraulic fluid in the hydraulic actuation example) is removed. The spring 244 is illustrated as a coil spring. However, other suitable types of springs have been contemplated such as a wave spring, for instance.

In the illustrated example, a bearing 246 is coupled to the rotational connection component 208 and the shaft 229. The bearing 246 may be a roller bearing or a bushing, for instance. To elaborate, in the roller bearing example, the bearing may have a cylindrical shape without shoulders in the inner ring, or with rollers running directly on the shaft. Since the actual movement is only needed when engaging or disengaging the clutch, the number of axial movements is constrained. Further, the bearing 246 and/or the other bearings described herein may be force lubricated (via a lubrication system 248, described in greater detail herein) to provide a target amount of lubrication to the bearings. Specifically, in one example, all of the bearings illustrated in FIG. 2A may be force lubricated to provide a desired amount of lubrication over the expected range of operating conditions.

A gap 231 (e.g., air gap) may be present between the drum 222 and the rotational connection component 208 to enable the rotational connection component 208 to rotate freely in the drum. The bearing 246 may be shouldered in the body 210 of the rotational connection component 208 or on the shaft 229 (to fix the bearing axially), to allow the axial movement of the component 208 during engagement or disengagement of the clutch. Alternatively, the bearing 246 may be assembled with a press fit or other suitable attachment scheme to the outer circumference 233 in the rotational connection component 208 (e.g., the body 210 of the rotational connection component).

The lubrication system 248 provides lubrication fluid (e.g., oil) to the plates in the clutch pack 204 and the plates in the clutch pack 206 and the clutch assembly bearings, in some cases. The lubrication system is schematically depicted in FIG. 2A. However, the lubrication system may include components such as one or more pump(s), fluid lines, conduits, valves, and the like which enable a targeted amount of lubrication fluid to be delivered to the clutch packs. Lubricating the clutch packs reduces clutch wear when the clutch pack is transitioned into engagement. However, when the clutch is disengaged, heat is transferred to the lubrication fluid via the rotating plates in the clutch. Therefore, reducing the differential speeds with regard to the clutch plates, will reduce the temperature of the lubrication fluid during clutch disengagement. Consequently, clutch longevity and reliability is increased.

FIG. 2A shows the clutch assembly 202 in a disengaged configuration. In the disengaged configuration torque is not transferred through the clutch assembly 202. To elaborate, the separator plates and the friction plates in both clutch packs 204, 206 are frictionally disengaged.

When the clutch assembly 202 is disengaged, a relative speed between the component 227 (e.g., the driven gear) and the rotational connection component 208 as well as the shaft 229 and the rotational connection component 208 may have a relative speed close to half of the relative speed that is present between the component 227 and the drum 222. To expound, the clutch packs may be sized to create a similar amount of resistance, as a result the speed of the rotational connection component 208 will be determined by the drag forces induced by both clutch packs and will be a result of it, by finding an equilibrium. For instance, in one specific use-case example, the shaft 229 may run at 1,000 revolutions per minute (rpm), and the component 227 may run 11,000 rpm. In this use-case example, the delta speed between them becomes 10,000 rpm. In that case the rotational connection component 208 runs approximately half of the differential speed, or will run about 6,000 rpm in this case. As a result, the relative speed between the friction plates 218 and the separator plates 225 will be about 5,000 rpm, and the relative speed in between the friction plates 214 and the separator plates 220 will also be about 5,000 rpm. In that case, the friction energy over one clutch pack will be about half compared to when a single clutch pack would have been used and the relative or differential speeds may be again within a target range for powershift and/or wet clutch transmissions. However, it will be understood that the plates may exhibit a variety of other speeds in other use case examples, and the clutch assembly may have a different configuration that yield different relative speed reductions across the clutch assembly.

FIG. 2B shows the clutch assembly 202 in an engaged configuration where torque is able to be transferred therethrough. In the engaged configuration, the piston 234 is moved in the direction 242.

To urge the piston 234 in the direction 242, when the actuation system 238 is configured as a hydraulic actuator, pressurized hydraulic fluid (e.g., oil) may be delivered to a piston chamber 250. When the hydraulic fluid pressure is able to overcome the force of the spring 244 the piston 234 moves in the direction 242. Therefore, in the engaged configuration, the spring 244 is compressed, as illustrated in FIG. 2B. Conversely, when the pressure drops below the threshold that overcomes the spring force, the piston moves in the opposite axial direction to place the clutch assembly back in a disengaged configuration. However, clutch assemblies with alternate actuation architectures have been contemplated. For instance, the spring may be compressed when the clutch assembly is in the disengaged configuration, in alternate examples. Still further in other examples, the spring may be omitted from the clutch assembly.

Moving the piston 234 in the direction 242 moves the friction and spacer plates 214, 220 in the clutch pack 204 of clutch assembly 200 into engagement. In turn, the rotational connection component 208 urges the friction and the spacer plates 218, 225 in the clutch pack 206 into frictional engagement. The general mechanical power path through the clutch assembly 200 is indicated at 252. As shown in FIG. 2B, power travels from the shaft 229 to the drum 222, from the drum through the first clutch pack 204 to the rotational connection component 208, and from the rotational connection component to the component 227 via the second clutch pack 206. However, it will be understood that the mechanical power path may travel in the reverse direction, in alternate transmission configurations.

The description of FIGS. 1-2B provide for a method in which the first and second clutch packs in the clutch assembly are jointly disengaged via operation of the actuation piston. To elaborate, the hydraulic pressure of the fluid applied to the actuation piston may be decreased to enable the piston to return to a disengaged position via expansion of the spring. However, the clutch actuation may have another suitable architecture, in other embodiments. The method may further include jointly engaging the clutch packs via operation of the actuation piston. For instance, the pressure applied to the piston may be increase above a threshold pressure that overcomes the spring force and urges the clutch pack plates into frictional engagement such that torque transfer between the hub and the gear occurs. It will be appreciated that the clutch may be placed in a partially engaged state where the clutch pack plates are slipping but torque transfer through the clutch is occurring.

The technical effect of the clutch assembly operating method described herein is to reduce clutch assembly wear by reducing the differential speed across the clutch. A more robust clutch is achieved with an increased lifespan.

FIGS. 2A and 2B are drawn approximately to scale. However, other relative component dimensions may be used in alternate examples. FIGS. 1-2B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such. Still further, an axis about which a component rotates may be referred to as a rotational axis. Components fixedly coupled to one another may be referred to as such.

The invention will be further described in the following paragraphs. In one aspect, a clutch assembly is provided that comprises a first clutch pack coupled to a component via a rotational connection component; a second clutch pack coupled to a drum via the rotational connection component; and an actuation piston configured to actuate the first clutch pack and the second clutch pack; wherein the first clutch pack is axially spaced away from the second clutch pack; and wherein the drum is coupled to a shaft.

In another aspect, a method for operation of a clutch assembly is provided that comprises: jointly disengaging a first clutch pack and a second clutch pack via operation of an actuation piston; wherein the clutch assembly includes: a rotational connection component; the first clutch pack coupled to a gear via the rotational connection component; and the second clutch pack coupled to a drum via the rotational connection component. In one example, the method may further comprise jointly engaging the first clutch pack and the second clutch pack via operation of the actuation piston.

In yet another aspect, a clutch assembly is provided that comprises a first clutch pack to couple a drive gear via a rotational connection component; a second clutch pack to couple a drum via the rotational connection component; and a hydraulic piston configured to jointly actuate the first clutch pack and the second clutch pack; wherein the first clutch pack is axially spaced away from the second clutch pack; wherein the first and second clutch packs are each coupled to the rotational connection component via a separate set of plates; and wherein the drum is coupled to a shaft.

In any of the aspects or combinations of the aspects, the first clutch pack may be coupled to the component via a first set of friction plates and coupled to the rotational connection component via a first set of separator plates.

In any of the aspects or combinations of the aspects, the second clutch pack may be coupled to the rotational connection component via a second set of friction plates and coupled to the drum via a second set of separator plates.

In any of the aspects or combinations of the aspects, the rotational connection component may be circumferentially enclosed by a portion of the drum.

In any of the aspects or combinations of the aspects, the clutch assembly may further comprise a return spring coupled to the actuation piston and positioned radially inward from the second clutch pack.

In any of the aspects or combinations of the aspects, the clutch assembly may further comprise an end plate coupled to the drum, wherein first clutch pack and the second clutch pack may be positioned axially between the end plate and the actuation piston.

In any of the aspects or combinations of the aspects, the clutch assembly may further comprise a bearing coupled to the shaft and the rotational connection component.

In any of the aspects or combinations of the aspects, the component may be a gear.

In any of the aspects or combinations of the aspects, the clutch assembly may be included in a transmission of an electric drive unit.

In any of the aspects or combinations of the aspects, the actuation piston may be a hydraulic piston.

In any of the aspects or combinations of the aspects, during disengagement, the rotational connection component may have a different operating speed than the gear and the drum.

In any of the aspects or combinations of the aspects, during disengagement, the drum may be coupled to a shaft and the shaft is positioned downstream of a traction motor.

In any of the aspects or combinations of the aspects, the separate sets of plates may be friction plates and/or separator plates.

In any of the aspects or combinations of the aspects, the actuation piston may be a hydraulic piston.

In any of the aspects or combinations of the aspects, the rotational connection component, the first clutch pack, and the second clutch pack may be circumferentially enclosed by a portion of the drum.

In any of the aspects or combinations of the aspects, the clutch assembly may further comprise a controller including instructions that when executed cause the controller to: jointly disengage the first clutch pack and the second clutch pack via operation of the hydraulic piston.

In any of the aspects or combinations of the aspects, the clutch assembly may further comprise a roller bearing or a bushing coupled to the rotational connection component and the shaft.

In another representation, a wet friction clutch is provided that comprises sequentially arranged clutch packs which are mechanically linked via a plate carrier for plates in each of the clutch packs and a piston actuator that is configured to actuate the clutch packs in tandem.

Note that the example control and estimation routines included herein can be used with various system (e.g., transmission) configurations. The control methods and routines disclosed herein may be stored as executable instructions in non-transitory memory and may be carried out by the control system including the controller in combination with the various sensors, actuators, and other system hardware in combination with the electronic controller. As such, the described actions, operations, and/or functions may graphically represent code to be programmed into non-transitory memory of the computer readable storage medium in the vehicle and/or powertrain control system. The various actions, operations, and/or functions illustrated may be performed in the sequence illustrated, in parallel, or in some cases omitted. Likewise, the order of processing is not necessarily required to achieve the features and advantages of the examples described herein, but is provided for case of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of traction motors, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A clutch assembly, comprising:
a first clutch pack to couple a drive gear via a rotational connection component;
a second clutch pack to couple a drum via the rotational connection component;
a hydraulic piston configured to jointly actuate the first clutch pack and the second clutch pack; and
a spring coupled to the hydraulic piston and positioned radially inward from the first clutch pack and the second clutch pack;
wherein the first clutch pack is axially spaced away from the second clutch pack;
wherein the first and second clutch packs are each coupled to the rotational connection component via a separate set of plates; and
wherein the drum is coupled to a shaft;
the clutch assembly further comprising a roller bearing or a bushing directly coupled to the rotational connection component and the shaft.

2. The clutch assembly of claim 1, wherein the separate sets of plates are friction plates and separator plates.

3. The clutch assembly of claim 1, wherein the rotational connection component, the first clutch pack, and the second clutch pack are circumferentially enclosed by a portion of the drum.

4. The clutch assembly of claim 1, further comprising a controller including instructions that when executed cause the controller to:
jointly disengage the first clutch pack and the second clutch pack via operation of the hydraulic piston.

\* \* \* \* \*